US010551620B2

(12) United States Patent
Cammenga et al.

(10) Patent No.: US 10,551,620 B2
(45) Date of Patent: Feb. 4, 2020

(54) HEADS UP DISPLAY SYSTEM (71) Applicant: Gentex Corporation, Zeeland, MI (US)

(72) Inventors: David J. Cammenga, Zeeland, MI (US); William L. Tonar, Holland, MI (US); David L. Poll, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/865,639

(22) Filed: Jan. 9, 2018

(65) Prior Publication Data

US 2018/0129046 A1    May 10, 2018

Related U.S. Application Data (63) Continuation of application No. 15/192,325, filed on Jun. 24, 2016, now Pat. No. 9,927,609.
(Continued)

(51) Int. Cl.
*G02B 27/01* (2006.01)
*G03B 21/604* (2014.01)
(Continued)

(52) U.S. Cl.
CPC .......... *G02B 27/0101* (2013.01); *B60K 35/00* (2013.01); *E06B 3/6722* (2013.01); *G02B 5/3058* (2013.01); *G02B 27/283* (2013.01); *G02F 1/0102* (2013.01); *G03B 21/604* (2013.01); *B60K 2370/1868* (2019.05); *B60K 2370/20* (2019.05); *B60K 2370/27* (2019.05); *B60K 2370/347* (2019.05); *G02B 2027/012* (2013.01); *G02B 2027/013* (2013.01);
(Continued)

(58) Field of Classification Search
CPC .............. B60K 35/00; B60K 2350/962; B60K 2350/2095; B60K 2350/206; B60K 2350/2056; E06B 3/6722; G02B 27/0101; G02B 27/283; G02B 5/3058; G02B 2027/012; G02B 2027/0194; G02B 2027/013; G02F 1/0102; G02F 1/13306; G02F 2203/09; G03B 21/604
USPC ........ 359/237, 238, 240, 245, 246, 630–632
See application file for complete search history.

(56) References Cited

U.S. PATENT DOCUMENTS 4,961,625 A  10/1990 Wood et al.
6,864,927 B1  3/2005 Cathey
(Continued)

FOREIGN PATENT DOCUMENTS

CN    1872761 A    12/2006
CN  101976009 A     2/2011
(Continued)

*Primary Examiner* — Tuyen Tra
(74) *Attorney, Agent, or Firm* — Price Heneveld LLP; Bradley D. Johnson (57) ABSTRACT A heads up display system of a vehicle includes a combiner screen having a first substantially transparent substrate defining a first surface and a second surface, a second substantially transparent substrate defining a third surface and a fourth surface. A primary seal is disposed between the first and second substrates. The seal and the first and second substrates define a cavity therebetween. An electro-optic material is positioned within the cavity and a transflective layer having a multilayer polymeric film positioned on one of the first and second surfaces, and a projector for projecting light having a first polarization toward the first surface of the first substrate.

20 Claims, 4 Drawing Sheets

Related U.S. Application Data (60) Provisional application No. 62/205,376, filed on Aug. 14, 2015.

(51) Int. Cl.
*G02B 27/28* (2006.01)
*G02F 1/01* (2006.01)
*G02B 5/30* (2006.01)
*B60K 35/00* (2006.01)
*E06B 3/67* (2006.01)
*G02F 1/133* (2006.01)

(52) U.S. Cl.
CPC .. *G02B 2027/0194* (2013.01); *G02F 1/13306* (2013.01); *G02F 2203/09* (2013.01)

(56) References Cited

U.S. PATENT DOCUMENTS

| | | |
|---|---|---|
| 6,979,499 B2 | 12/2005 | Walck et al. |
| 7,123,418 B2 | 10/2006 | Weber et al. |
| 7,636,188 B2 | 12/2009 | Baur et al. |
| 9,429,757 B1 | 8/2016 | Peeri |
| 2002/0196518 A1 | 12/2002 | Xu et al. |
| 2005/0200934 A1 | 9/2005 | Callahan et al. |
| 2006/0066508 A1 | 3/2006 | Walck et al. |
| 2008/0094547 A1 | 4/2008 | Sugita et al. |
| 2008/0218434 A1 | 9/2008 | Kelly et al. |
| 2009/0029112 A1 | 1/2009 | Otake |
| 2009/0153961 A1 | 6/2009 | Murakami et al. |
| 2010/0097469 A1 | 4/2010 | Blank et al. |
| 2010/0283957 A1 | 11/2010 | Matera et al. |
| 2013/0038511 A1 | 2/2013 | Box |
| 2015/0085341 A1 | 3/2015 | Ash et al. |
| 2017/0052369 A1 | 2/2017 | Shimatani et al. |

FOREIGN PATENT DOCUMENTS

| | | |
|---|---|---|
| DE | 102012019506 A1 | 4/2014 |
| EP | 2131227 A1 | 9/2009 |
| EP | 2131227 A2 | 9/2009 |
| EP | 3310608 A1 | 4/2018 |
| FR | 2922328 A1 | 4/2009 |
| GB | 2368403 A | 5/2002 |
| JP | H07140308 A | 6/1995 |
| JP | H11249061 A | 9/1999 |
| JP | H11249062 A | 9/1999 |
| JP | H11281916 A | 10/1999 |
| JP | 2004271830 A | 9/2004 |
| JP | 2005112352 | 4/2008 |
| JP | 2008102416 A | 5/2008 |
| JP | 2009031537 A | 2/2009 |
| JP | 2009529153 A | 8/2009 |
| JP | 2010160504 A | 7/2010 |
| JP | 2010536068 A | 11/2010 |
| JP | 2010277016 A | 12/2010 |
| JP | 2014010321 A | 1/2014 |
| KR | 100176767 | 5/1999 |
| KR | 20110127470 A | 11/2011 |
| WO | 0023826 A3 | 4/2000 |
| WO | 03098339 A2 | 11/2003 |
| WO | 2003098339 A2 | 11/2003 |
| WO | 2007011047 A1 | 1/2007 |
| WO | 2007103342 A2 | 9/2007 |
| WO | 2008053109 A2 | 5/2008 |
| WO | 2009020846 A1 | 2/2009 |
| WO | 2009053609 A1 | 4/2009 |
| WO | 2009146837 A1 | 12/2009 |
| WO | 2013190959 A1 | 12/2013 |
| WO | 2014061138 A1 | 4/2014 |

HEADS UP DISPLAY SYSTEM

CROSS-REFERENCE TO RELATED APPLICATIONS

This application is a continuation of and claims priority to U.S. patent application Ser. No. 15/192,325, filed Jun. 24, 2016, entitled HEADS UP DISPLAY SYSTEM, now U.S. Pat. No. 9,927,609, which claims the benefit of and priority to U.S. Provisional Patent Application No. 62/205,376, filed on Aug. 14, 2015, entitled ELECTRO-OPTIC ASSEMBLY, the entire disclosure of which is hereby incorporated herein by reference.

FIELD OF THE DISCLOSURE

The present disclosure generally relates to a heads up display, and more particularly, to a heads up display having a transflective layer.

BACKGROUND

Heads up displays for vehicles may provide information overlaid on ambient light transmitted through the display. In some circumstances, reflectance off of surfaces of the display may produce undesirable double imaging.

SUMMARY OF THE DISCLOSURE

According to at least one feature of the present disclosure, a heads up display system of a vehicle includes a combiner screen having a first substantially transparent substrate defining a first surface and a second surface and a second substantially transparent substrate defining a third surface and a fourth surface. A primary seal is disposed between the first and second substrates. The seal and the first and second substrates define a cavity therebetween. An electro-optic material is positioned within the cavity and a transflective layer having a multilayer polymeric film is positioned on one of the first and second surfaces, and a projector for projecting light having a first polarization toward the first surface of the first substrate.

According to another feature of the present disclosure, a combiner screen for a heads up display includes a first substantially transparent substrate and a second substantially transparent substrate. At least one of the first and second substantially transparent substrates is curved along at least two axes. An electro-optic material is positioned between the first and second substantially transparent substrates and a reflective polarizer laminated to the first substantially transparent substrate. The reflective polarizer includes a polymeric film.

According to another feature of the present disclosure, a heads up display system of a vehicle including a projector for projecting light of a first polarization and a combiner screen having a substantially transparent substrate defining a first surface and a second surface. The substrate is curved along at least two axes. A reflective polarizer having a polymeric material is positioned on the second surface of the substantially transparent substrate. The combiner screen has a reflectance of the first polarization of light greater than about 40%.

These and other features, advantages, and objects of the present disclosure will be further understood and appreciated by those skilled in the art by reference to the following specification, claims, and appended drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With regard to FIGS. 1A-2A, reference numeral 10 generally designates a heads up display system of a vehicle 14. The heads up display 10 may include a combiner screen 18. The combiner screen 18 may include a first substantially transparent substrate 22 defining a first surface 22A and a second surface 22B. A second substantially transparent substrate 26 defines a third surface 26A and a fourth surface 26B. A primary seal 34 is disposed between the first and second substrates 22, 26. The seal 34 and the first and second substrates 22, 26 are positioned in a spaced apart configuration to define a cavity 38 therebetween. An electro-optic material 42 is positioned within the cavity 38. A transflective layer 46 is positioned on the first surface 22A. A projector 50 projects light toward the first surface 22A of the first substrate 22. The light from the projector 50 may be unpolarized or polarized. Polarized light emitted from the projector 50 may have a horizontal or vertical polarization angle (e.g., a first or second polarization of light), a 45° angle polarization or variations therebetween.

Figure 1A:
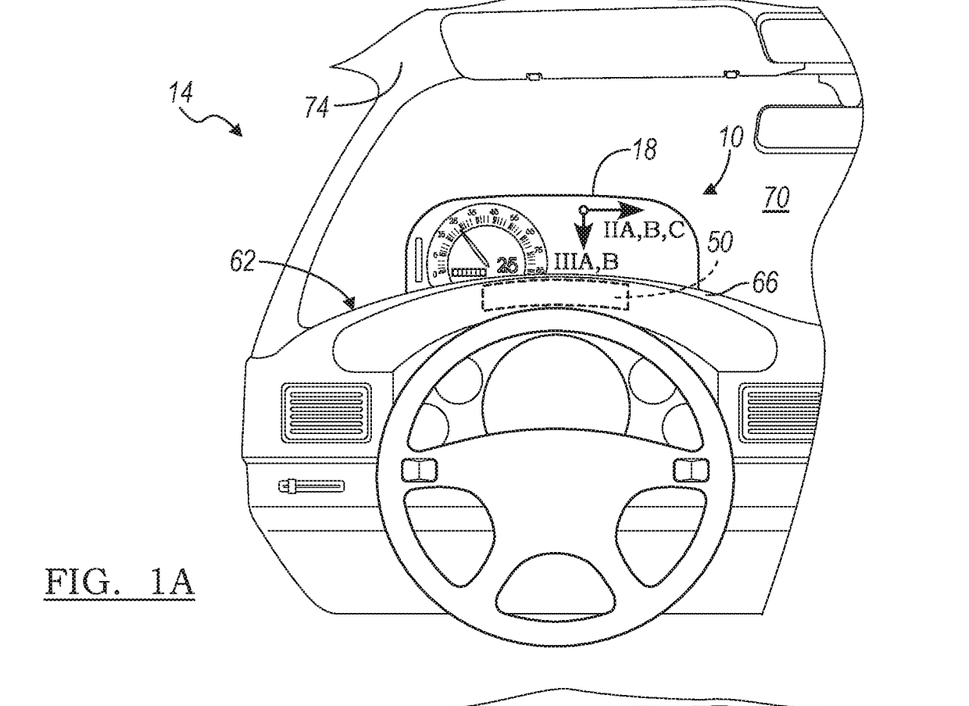
FIG. 1A is a front elevational view of a heads up display system, according to one example.
Figure 1B:
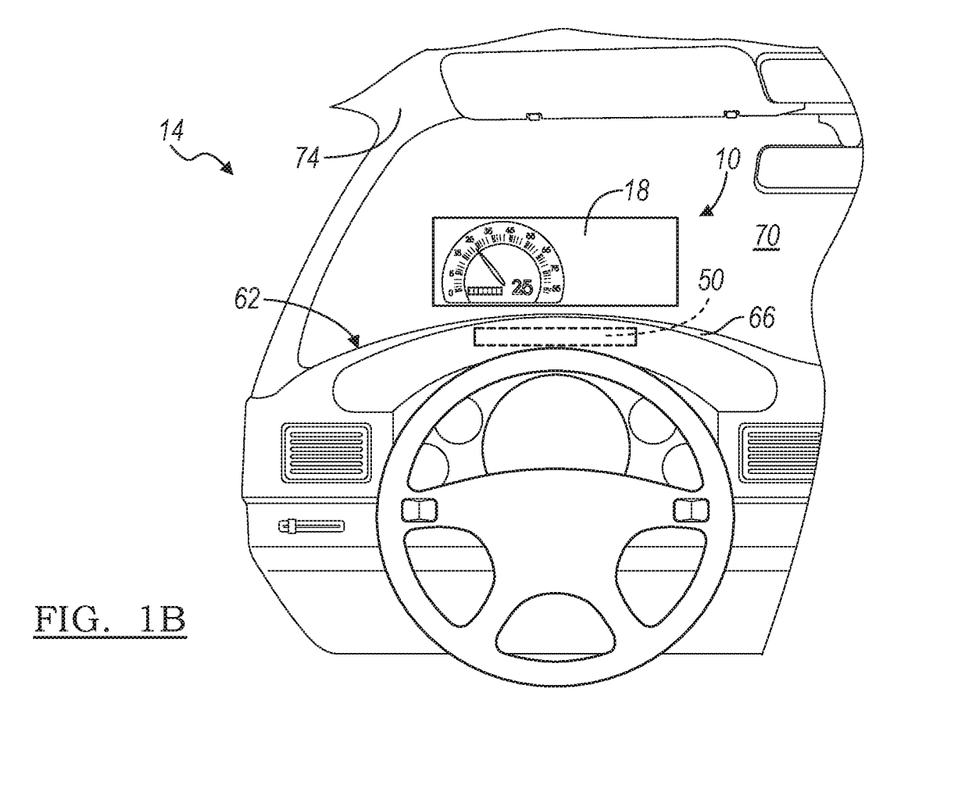
FIG. 1B is a front elevational view of the heads up display system, according to another example.

With respect to FIGS. 1A and 1B, the heads up display system 10 is depicted within the vehicle 14. It will be understood that while depicted within the vehicle 14, the heads up display system 10 may equally be used in aerospace applications, window applications, transparency applications, augmented realty applications and other applications where a viewer may wish to see both information (e.g., vehicle related functions or driver assistance systems such as alerts, warnings or vehicle diagnostics) and what is behind the combiner screen 18. As an example, in FIGS. 1A and 1B, the speed of the vehicle 14 is being displayed on the combiner screen 18 using an image of a speedometer. Heads up displays are used in many automotive and aerospace applications to present information to a driver or pilot while allowing simultaneous forward vision. In the depicted examples within the vehicle 14, the combiner screen 18 may extend from an instrument panel 62 and/or cluster hood 66 (FIG. 1A) or be positioned directly on or integrated as part of a windscreen 70 of the vehicle 14 (FIG. 1B). In the examples where the combiner screen 18 extends from the instrument panel 62 and/or cluster hood 66, the combiner screen 18 may be a standalone component. Such an example may be advantageous in providing shapes (e.g., curvature) to the combiner screen 18 which are different than the windscreen 70. In examples where the combiner screen 18 is located on or within the windscreen 70, the combiner screen 18 may share one or more substrates (e.g., the first or second substrates 22, 26) with the windscreen 70. Such an example may be advantageous in reducing complexity, weight and manufacturing costs of the heads up display system 10 and the vehicle 14.

The projector 50 is positioned proximate the combiner screen 18 and is configured to project light onto the combiner screen 18, as explained in greater detail below, to form an image which is reflected toward an intended viewer (e.g., a driver or occupant of the vehicle 14). The projector 50 may be located proximate the cluster hood 66, or in a roof 74 of the vehicle 14. The projector 50 is a light engine capable of producing un-polarized or polarized light including, but not limited to, certain liquid crystal displays (LCDs), laser diodes, and organic light emitting diodes (OLEDs). In polarized light examples of the projector 50, the polarized light emitted may have a horizontal or vertical polarization angle or variations therebetween. In some instances, the polarized light from the projector 50 may be circularly polarized. For example, circular polarization of the light may be achieved when linearly polarized light from the projector 50 passes through a ¼ wave plate. The combiner screen 18 of the heads up display system 10 is shaped, as explained in greater detail below, such that a resultant reflected image "appears" to be forward of the combiner screen 18 and forward of the vehicle 14. The exact surface contour of the combiner screen 18 needed to attain this characteristic is a function of properties of the projector 50, location of the combiner screen 18, location of the projector 50 and the location of the viewer (e.g., the driver and/or passenger to which information is intended to be displayed). Having the image projected forward of the vehicle 14 allows the viewer to obtain the desired information without having to change the focal distance of the viewer's eyes. In a traditional display located within the vehicle 14, the viewer's eyes often have to refocus to the shorter viewing distance, thus decreasing the time spent viewing the road. Furthermore, the viewer's eyes will also then have to re-focus on the road ahead, which further decreases the time spent viewing the road and forward conditions. The shape of the combiner screen 18 should also be selected so as to preserve the basic characteristics of the projected image (i.e., straight lines remain straight, aspect ratios of images are preserved, etc.).

Although depicted on a driver side of the vehicle 14, it will be understood that the heads up display system 10, or components thereof (e.g., the combiner screen 18 and/or the projector 50), may be positioned on a passenger side of the vehicle 14, or a top of the windscreen 70, without departing from the teachings provided herein. According to one example, the combiner screen 18 may be located on, or proximate an, upper portion of a windscreen 70. As explained in greater detail below, the combiner screen 18 may be operated at different transmittance levels to affect a variety of functions. For instance, when ambient light levels at the front of the vehicle 14 are relatively high, the combiner screen 18 may be operated at a darkened state to increase the visibility of information reflected therefrom. In another instance, the combiner screen 18 may be operated at a darkened state to function as a sun visor thereby shielding the eyes of the viewer from incoming sunlight. Thus, it should be appreciated that the transmittance levels of the combiner screen 18 may be adjusted independently of display functionality. That is, the transmittance levels of the combiner screen 18 are adjustable regardless of whether or not information is being displayed or the projector 50 is emitting light. In some instances, it may be desirable to have more than one combiner screen 18. For example, a first combiner screen 18 may be positioned on the driver side to display information (e.g., vehicle related information) to the driver and/or function as a sun visor. A second combiner screen 18 may be positioned on the passenger side to display information (e.g., vehicle related information and/or media, such as movies and games) to the passenger and/or function as a sun visor. It is contemplated that the various functions of the combiner screen 18 described herein may be automatically and/or manually controlled. For example, the combiner screen 18 may be darkened in response to ambient light levels sensed by a vehicle light sensor (e.g., proximate the windscreen 70 or in a rearview mirror assembly). According to various examples, the combiner screen 18 may be configured to fail in a transparent state (i.e., ambient light may still pass though the combiner screen 18.

Figure 2A:
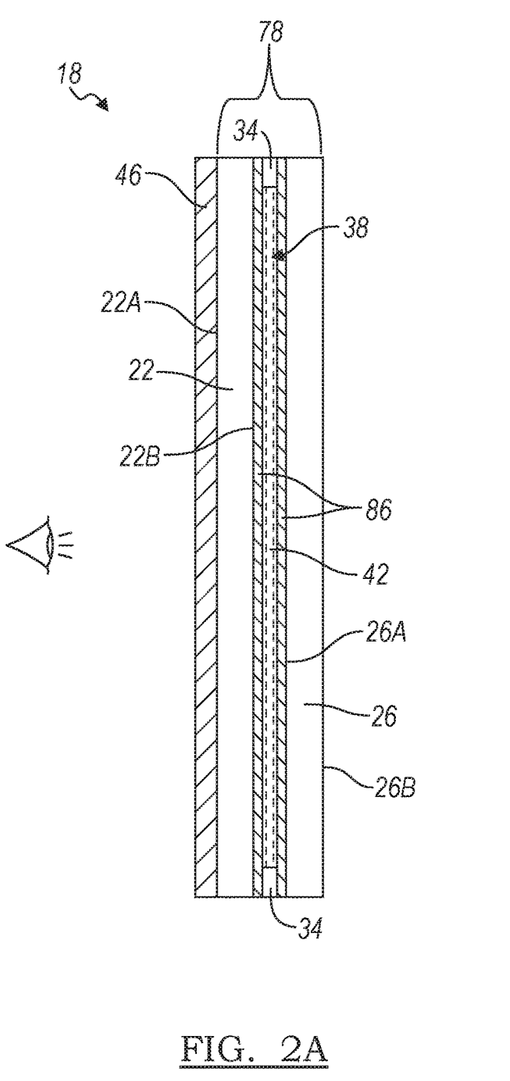
FIG. 2A is a cross-sectional view of the combiner screen taken at line IIA of FIG. 1A, according to one example.

Referring now to FIG. 2A, in the depicted example, the combiner screen 18 includes the first and second substrates 22, 26. The first substrate 22 may be composed of a substantially transparent material such as glass (e.g., soda lime glass), a polymeric material (e.g., acrylic and/or polycarbonate), or combinations thereof. The first substrate 22 may have a thickness of less than about 2.2 mm, 2.0 mm, 1.5 mm, 1.2 mm or less than about 1.0 mm. The first substrate 22 may take a variety of shapes including square, rectangular, circular, oblong and combinations thereof. The first substrate 22 may have a length and/or width dimension of, or greater than, about 10 mm, 20 mm, 50 mm, 75 mm, 85 mm, 100 mm, 150 mm, 175 mm, 200 mm, 250 mm, 300 mm or 500 mm. According to various examples, the first substrate 22 may have a curvature across the length or width (i.e., a vertical or horizontal axis) of the substrate 22. For example, the first substrate 22 may have a radius of curvature (i.e., as measured from a theoretical central point of the curvature of the first surface 22A) of less than about 2000 mm, 1500 mm, 1300 mm, 1250 mm, 1200 mm, 1100 mm, 1000 mm, 900 mm, 800 mm, 700 mm, 600 mm, 500 mm, 400 mm, 300 mm, 200 mm or less than about 100 mm. In a specific example, the first surface 22A of the first substrate 22 may be about 500 mm. In spherical curvature examples of the first substrate 22, the radius of curvature of the first surface 22A in a vertical direction and a horizontal direction may be approximately equal (e.g., about 500 mm). In yet other examples, the first substrate 22 may be curved to have a "free-form" shape (e.g., the curvature along the horizontal and/or vertical directions may vary). The curvature of the first substrate 22 may make the first substrate 22 substantially convex or concave toward the viewer. It will be understood that the first substrate 22 may be "stitched" together from multiple separate components to form a larger first substrate 22. It will be understood that the dimensions, thickness and/or curvature of the separate components of the stitched example of the first substrate 22 may be equal or vary between the separate components.

In the depicted example, the first substrate 22 is part of an electro-optic element 78. The electro-optic element 78 includes the first and second substrates 22, 26, the primary seal 34 and the electro-optic material 42. The second substrate 26 may be composed of a substantially transparent material such as glass (e.g., soda lime glass), a polymeric material (e.g., acrylic), or combinations thereof. It will be understood that the second substrate 26 may have the same or different dimensions, thicknesses and/or radii of curvature as the first substrate 22. Further, it will be understood that the second substrate 26 may be "stitched" together in a similar manner to that described in connection with the first substrate 22. In a specific example, the second substrates 26 may be approximately 1.6 mm in thickness. The second substrate 26 may have a curvature along its length and width, similar to that of the first substrate 22. In a specific example, the second substrate 26 may have a spherical radius of curvature of approximately 1250 mm. Edges of the first and second substrates 22, 26 may be generally rounded. The radius of curvature of the rounded edges may be greater than about 2.5 mm.

When laminating two rigid substrates (e.g., the first substrate 22 and the second substrate 26) it is important that the stress is minimized in the final lamination. For example, if there are two pieces of bent glass that are 3 mm in thickness, and the curvature of each piece does not match well, the force required to hold the two pieces parallel is high, and, over time, the lamination may fail, especially at elevated temperatures often found in automotive and aerospace applications. One solution to this stress problem is to make sure the curvature on the substrates match very accurately. In a specific example, the first and second substrates 22, 26, with all intervening layers as described below, may be curved or bent at an elevated temperature together to form a matched pair so that there is high curvature match between the first and second substrates 22, 26.

In the depicted embodiment, positioned on the second and third surfaces 22B, 26A of the respective first and second substrates 22, 26 is an electrically conductive layer 86. The electrically conductive layers 86 may include a transparent conductor such as a transparent metal oxide (e.g., indium tin oxide, F:SnO2, ZnO, IZO), carbon (graphene and/or graphite) and/or a conductive metal mesh (e.g., nanowires). In indium tin oxide examples, the electrically conductive layers 86 may have a sheet resistance of approximately 12 ohms/sq.

The first and second substrates 22, 26 can be positioned in a parallel relationship and sealed around the perimeter using the primary seal 34. The seal 34 extends around the second and third surfaces 22B, 26A to confine the electro-optic material 42 between the first and second substrates 22, 26. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is herein incorporated by reference in its entirety.

According to one example, the electro-optic element 78 may be a liquid crystal device, including a liquid crystal medium (e.g., the electro-optic material 42), configured to attenuate light transmitted through the combiner screen 18 (i.e., decrease the transmission of light through the combiner screen 18). In another example, the electro-optic element 78 may be a suspended particle device. In yet another example, the electro-optic element 78 may be an electrochromic element. In such an example, the electro-optic material 42 of the electro-optic element 78 is an electrochromic medium which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," 5,998,617 entitled "ELECTROCHROMIC COMPOUNDS," 6,020,987 entitled "ELECTROCHROMIC MEDIUM CAPABLE OF PRODUCING A PRE-SELECTED COLOR," 6,037,471 entitled "ELECTROCHROMIC COMPOUNDS," 6,141,137 entitled "ELECTROCHROMIC MEDIA FOR PRODUCING A PRE-SELECTED COLOR," 6,241,916 entitled "ELECTROCHROMIC SYSTEM," 6,193,912 entitled "NEAR INFRARED-ABSORBING ELECTROCHROMIC COMPOUNDS AND DEVICES COMPRISING SAME," 6,249,369 entitled "COUPLED ELECTROCHROMIC COMPOUNDS WITH PHOTOSTABLE DICATION OXIDATION STATES," and 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES;" U.S. Patent Application Publication No. 2002/0015214 A1 entitled "ELECTROCHROMIC DEVICE;" and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. According to various examples, the electro-optic element 78 may be configured to fail in a transparent state such that in the event of failure, the combiner screen 18 may still be usable. Use of electro-chromic examples of the electro-optic element 78 may be advantageous because electrochromics may have a very wide gray scale. Further, the gray scale of the electrochromics may be angle independent such that the perceived darkening of the electro-optic element 78 does not vary as a driver shifts their perspective of the combiner screen 18.

Figure 2B:
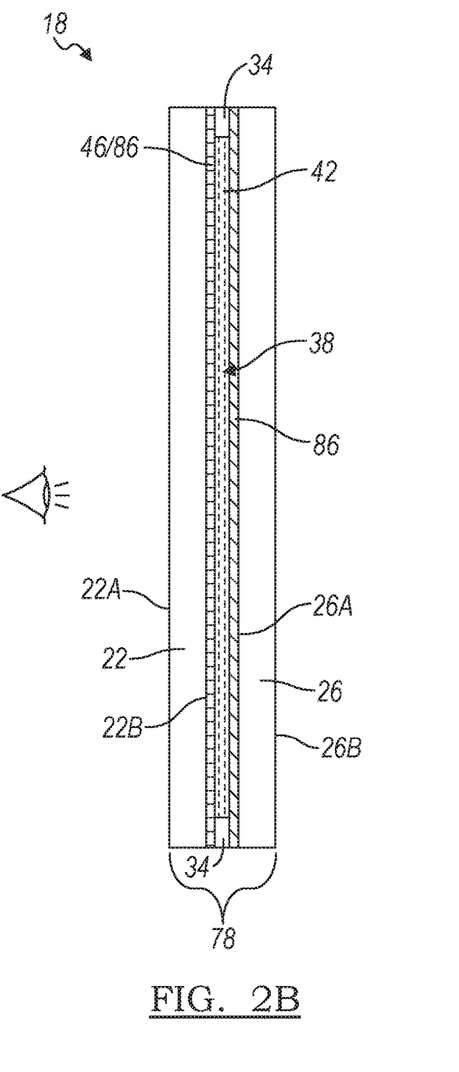
FIG. 2B is a cross-sectional view of the combiner screen taken at line IIB of FIG. 1A, according to one example.

Referring now to FIGS. 2A and 2B, the combiner screen 18 may include one or more transflective layers 46. The transflective layer 46 is a layer which may transmit a portion of incident light and reflect a portion of incident light. According to various examples, the transflective layer 46 may be configured to reflect a percentage of light of any polarization angle, or may be configured to reflect light of only a certain polarization angle. The transflective layer 46 is configured to reflect a primary image from the projector 50 (FIG. 1A) while also permitting ambient light to pass through the combiner screen 18. In the depicted examples, the transflective layer 46 may be positioned on the first surface 22A of the first substrate 22 (FIG. 2A) and/or on the second surface 22B of the first substrate 22. It will be understood that the transflective layer 46 may alternatively be positioned on the third or fourth surfaces 26A, 26B without departing from the teachings provided herein. The transflective layer 46 and the electrically conductive layers 86 (e.g., on the third surface 26A) are positioned on opposite sides of the electro-optic material 42.

According to various examples, the transflective layer 46 may include one or more reflective polarizers. Such reflective polarizers may include films. Use of a reflective polarizer as the transflective layer 46 may increase the efficiency of the heads up display system 10. For example, a non-polarization sensitive reflector that is 50% reflective will reflect 50% of the polarized light while transmitting the rest. In contrast, when the reflective polarizer is oriented such that its reflective axis is parallel to the polarization angle of the light outputted by the projector 50, approximately 100% of the polarized light will be reflected and approximately 50% of ambient light will be transmitted (e.g., due to the random polarization angles of ambient light). The reflective polarizers may include a wire grid polarizer or a multilayer plastic film such as a dual brightness enhancement film (DBEF) polarizer In examples of the transflective layer 46 incorporating a DBEF film reflective polarizer, the reflective polarizer may be laminated directly to curved examples of the first and/or second substrates 22, 26. Although laminating a film to a flat rigid substrate is known in the art, it has been discovered that lamination of the reflective polarizer, specifically DBEF film examples of the reflective polarizer, to curved substrates may produce an excellent transflective layer 46. Even further, it is surprising and unexpected to find that the DBEF film may be successfully laminated to a substrate with curvature in two dimensions (e.g., spherically curved). DBEF film examples of the transflective layer 46 may be laminated to substrates (e.g., the first and/or second substrates 22, 26) with a curvature having a radius of greater than or equal to about 500 mm, 600 mm, 700 mm, 800 mm, 900 mm, 1000 mm, 1100 mm, 1200 mm, 1230 mm, 1300 mm, 1400 mm or about 1500 mm in the vertical and/or horizontal directions. The laminated examples of the DBEF film may have a reflectance of ambient light greater than about 5%, 10%, 20%, 30%, 40%, 45%, 49%, 50%, or greater than about 51%. The laminated examples of the DBEF film may have a transmittance of ambient light greater than about 5%, 10%, 20%, 30%, 40%, 45%, 49%, 50%, or greater than about 51%. Further, the laminated examples of the DBEF film may have a reflectance of greater than about 30%, 40%, 50%, 60%, 70%, 80%, 90%, 91% 95%, or 99% of light having a polarization angle substantially equal to the reflective polarization angle of the reflective polarizer. According to a specific example, a DBEF film is positioned and laminated between two pieces of soda lime glass with a spherical radius of 500 mm and size of 175 mm×85 mm. The reflectance of the laminated example is approximately 51% and the transmission is approximately 46%. When measured with a crossed absorbing linear polarizer, the transmission drops to about 1.5%. A similar construction with a flat glass substrate produces identical results demonstrating that with this construction, the reflective polarizer properties have not changed as a result of laminating to a bent substrate.

Referring now to FIG. 2B, depicted is an alternate example of the combiner screen 18 of the heads up display 10. In the depicted example, the transflective layer 46 is positioned within the electro-optic element 78 on the second surface 22B of the first substrate 26. In such an example, the transflective layer 46 may include a wire grid polarizer. It will be understood that the transflective layer 46 may also be applied to the third surface 26A without departing from the teachings provided herein. In the depicted example, the transflective layer 46 functions as one of the electrically conductive layers 86 to provide electrical power to the electro-optic material 42 of the electro-optic element 78. In other words, the wire grid polarizer example of the transflective layer is electrically connected with the electro-optic material 42.

Use of a wire grid polarizer as the transflective layer 46 in the depicted configuration (i.e., within the electro-optic element 78) may offer several advantages. If the wire grid is conductive, it can be used as one of the electrically conductive layers 86 for the electro-optic device 78 such that the wire grid polarizer will function as both the transflective layer 46 and the electrode. This example of the transflective layer 46 may be combined with other coatings to improve conductivity to better function as an electrode. The wire grid polarizer/electrically conductive layer 86 may be aligned with the polarization angle of the projector 50 to maximize the reflection of the primary image.

Referring now to FIGS. 2A and 2B, in regards to examples of the combiner screen 18 incorporating the electro-optic element 78, the image projected onto the combiner screen 18 should be bright enough to see in any condition. This is particularly challenging when the lighting outside the vehicle 14 is bright. The contrast between the reflected light from the combiner screen 18 and the lighting behind the combiner screen 18 can be low on a bright sunny day. A brighter, more intense lighting source (e.g., projector 50) improves the contrast, increasing the brightness of reflected image of the combiner screen 18, but may not be the most economical solution and a reflected image that is bright enough to provide reasonable contrast in very bright daylight conditions may be too bright in other conditions. Although controls may be used to deal with variations in brightness, the specific background to the combiner screen 18 is ever changing when the vehicle 14 is moving, and depends in part on the position of the driver's eyes. Accordingly, as described above, the electro-optic element 78 can be configured to lower the transmission of the combiner screen 18 to increase the contrast of the reflected image relation to the background of the combiner screen 18.

As explained above, there may be a need for a higher or lower transmittance in the un-darkened state, different reflectance values for optimal contrast ratios, and/or broader dynamic range of the transmittance levels depending on the application. The initial and range of reflectance and transmittance properties of the combiner screen 18 is further complicated by the capabilities of the projector 50 and its light output capabilities along with the light transmittance levels for the windscreen 70 (FIG. 1A). The windscreen 70 will have a direct impact on the contrast ratio and visibility of the combiner screen 18. There are a number of factors which affect the transmittance levels of the windscreen 70. The minimum light transmittance of the windscreen 70 is based on the regulations of the locality in which the vehicle 14 is sold, but higher transmittance levels may be present based on how the vehicle 14 is equipped and marketed. This range of factors creates the need for solutions which can be adapted to different vehicle and environmental conditions. Accordingly, the electro-optic element 78 can be controlled to vary the amount of light transmission through the combiner screen 18 based on input from a control circuit. For example, in daylight conditions the combiner screen 18 may be darkened to improve the contrast ratio and allow for improved visibility of the reflected image from the combiner screen 18.

The electro-optic element 78 can have a clear state reflectance of approximately 25% and a transmittance of approximately 24%. The electro-optic element 78 can have a low end transmittance of approximately 10.5% and a low end reflectance of about 15%. Alternatively, in other examples, the high end transmittance may be greater than about 45% or even about 60%. The characteristics of the device may also be altered so that the low end transmittance is less than about 7.5% or even less than about 5%. In some examples, transmittance levels down to about 2.5% or less may be achievable. Increasing the high-end transmittance may be obtained by the use of coatings and materials which have low absorption, as explained above. Lower low-end transmittances may be obtained through the inclusion of materials which have higher absorption. If a wide dynamic range is desired, then low absorption materials may be used in combination with electro-optic materials 42 and cell spacing which attain higher absorbance in the activated state. Those skilled in the art will recognize that there exists a multitude of combinations of coatings and electro-optic materials 42, cell spacing and coating conductivity levels which can be selected to attain particular device characteristics.

Figure 2C:
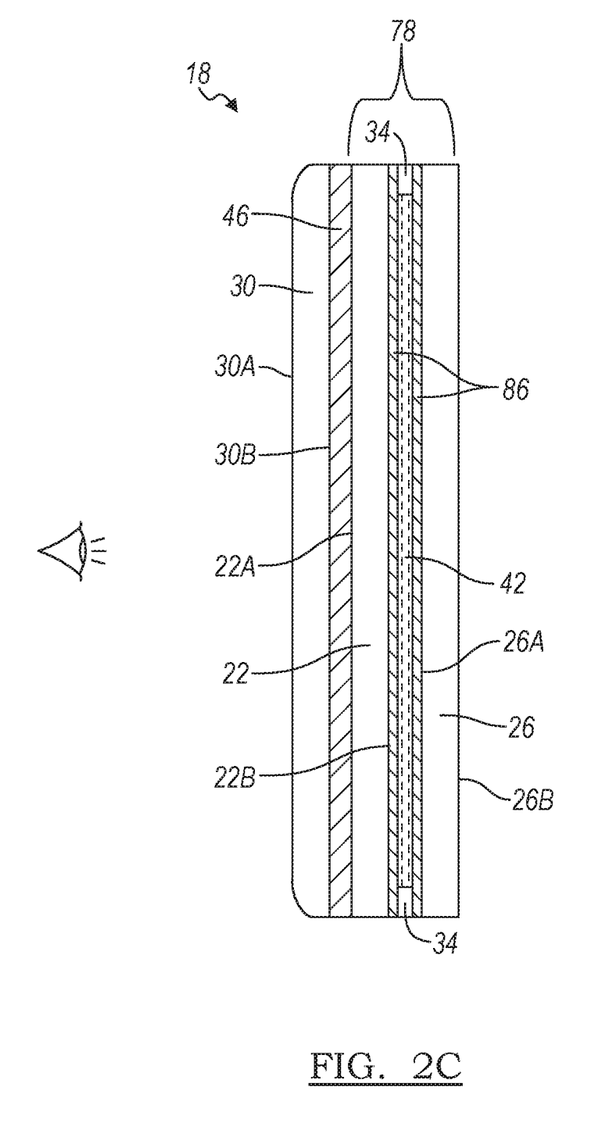
FIG. 2C is a cross-sectional view of the combiner screen taken at line IIC of FIG. 1A, according to one example.

Referring now to FIG. 2C, in the depicted example, the combiner screen 18 includes a third substrate 30. The third substrate 30 may define a fifth surface 30A and a sixth surface 30B. The third substrate 30 may be composed of a substantially transparent material such as glass (e.g., soda lime glass), a polymeric material (e.g., acrylic), or combinations thereof. The third substrate 30 may have a thickness of less than about 2.2 mm, 2.0 mm, 1.5 mm, 1.2 mm, 1.0 mm, 0.8 mm, 0.6 mm, or less than about 0.5 mm. The third substrate 30 may take a variety of shapes including square, rectangular, circular, oblong and combinations thereof. The third substrate 30 may have a length and/or width dimension of, or greater than, about 10 mm, 20 mm, 50 mm, 75 mm, 85 mm, 100 mm, 150 mm, 175 mm, 200 mm, 250 mm, 300 mm or 500 mm. According to various examples, the third substrate 30 may have a curvature across the length or width (i.e., a vertical or horizontal axis) of the substrate 30. For example, the third substrate 30 may have a radius of curvature (i.e., as measured from a theoretical central point of the curvature of the fifth surface 30A) of less than about 1300 mm, 1200 mm, 1100 mm, 1000 mm, 900 mm, 800 mm, 700 mm, 600 mm, 500 mm, 400 mm, 300 mm, 200 mm or less than about 100 mm. In a specific example, the fifth surface 30A of the third substrate 30 may be about 500 mm. In spherical curvature examples of the third substrate 30, the radius of curvature of the fifth surface 30A in a vertical direction and a horizontal direction may be approximately equal (e.g., about 500 mm). In yet other examples, the third substrate 30 may be curved to have a so-called "free-form" shape (e.g., the curvature along the horizontal and/or vertical directions may vary). The curvature of the third substrate 30 may make the third substrate 30 substantially convex or concave toward the viewer. It will be understood that the third substrate 30 may be "stitched" together from multiple separate components to form a larger third substrate 30. It will be understood that the dimensions, thickness and/or curvature of the separate components of the stitched example of the third substrate 30 may be equal or vary between the separate components.

In a specific example, the first and third substrates 22, 30, with all intervening layers (e.g., the transflective layer 46), may be curved or bent at an elevated temperature together to form a matched pair so that there is high curvature match between the first and third substrates 22, 30. Another approach to reduce the stress is to make one of the substrates (e.g., the third substrate 30) thin. Even if the curvature does not match well, the thinner substrate may have a significantly reduced strength. The overall stress, therefore, may be reduced. Since the strength of a substrate is related to the cube of the thickness, reducing the thickness has a large effect on strength and, therefore, a large effect on the stress of the substrates and any intervening layers. Further, a thin third substrate 30 may be advantageous for reflectivity reasons, as explained in greater detail below. In the depicted example, the combiner screen 18 includes the transflective layer 46 positioned behind the third substrate 30 relative to the viewer. In such an example, it may be advantageous to use a thin example of the third substrate 30. When the projector 50 (FIG. 1A) is aligned with the transflective layer 46, there are essentially two reflections. The first reflection is the primary reflection off of the transflective layer 46. The secondary reflection is the reflection off of the fifth surface 30A of the third substrate 30. The reflection from the fifth surface 30A will be just over 4% with glass examples of the third substrate 30, unless an anti-reflective coating is added. For the best reflected image, regardless of the intensity of the reflected image, it may be beneficial to have as small an offset between the position of the primary and secondary reflections as possible. A thinner third substrate 30 reduces the offset between the two images. If an antireflective coating is added to the fifth surface 30A of the third substrate 30, the reflection from the fifth surface 30A may be less than about 0.5%, or less than about 0.3%, or less than about 0.2%. Use of the third substrate 30 may be advantageous in that it may provide protection to the transflective layer 46 (e.g., from scratches, dirt, water, dust, etc. that may be present in an automotive environment). Further, use of the thin examples of the third substrate 30 and the transflective layer 46 position between the sixth and first surfaces 30B, 22A may allow for the reduction or elimination of antireflective layers within the combiner screen 18.

Figure 3A:
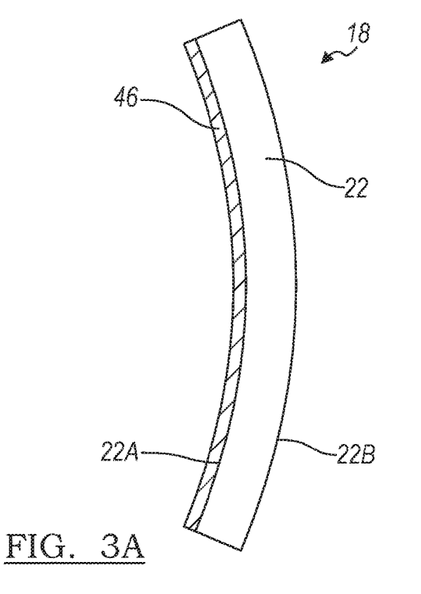
FIG. 3A depicts a cross-sectional view of the combiner screen taken at line IIIA of FIG. 1A, according to another example.
Figure 3B:
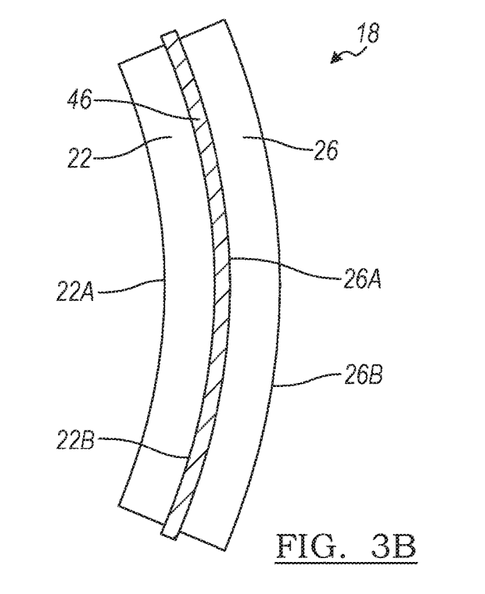
FIG. 3B depicts a cross-sectional view of the combiner screen taken at line IIIB of FIG. 1A, according to another example.

Referring now to FIGS. 3A and 3B, depicted are examples of the combiner screen 18 not including the electro-optic element 78. With reference to FIG. 3A, the combiner screen 18 may be formed of a single substrate (e.g., the first substrate 22). In the depicted example, the transflective layer 46 is positioned on the first surface 22A of the first substrate 22. In the depicted example, the first substrate 22 is curved as described in connection with the example of the combiner screen 18 disclosed in connection with FIGS. 2A and 2B. As the transflective layer 46 is exposed to the environment (i.e., not covered or protected by a substrate), an optional protective layer may be disposed over the transflective layer 46 to protect it from environmental exposure. Such an example where the combiner screen 18 includes the transflective layer 46 on the first surface 22A of the first substrate 22 may be advantageous in that it may eliminate any double reflection that may be present due to a substrate being present between the transflective layer 46 and the viewer. It will be understood that in practice the reflectance off of the first surface 22A may not create any significant double image (e.g., the reflectance off of the first surface 22A may be about 4% or less) when compared to the reflection off of the transflective layer 46. Since the first surface 22A and the second surface 22B may be essentially parallel, the offset of the two images is generally small and therefore the 4% reflectance off of the 1st surface may not create an objectionable double image. A thinner first substrate 22 (e.g., similar to the third substrate 30) may reduce the offset between the images. A thickness of the first substrate 22 less than 1.6 mm may be preferred.

Referring now to FIG. 3B, the transflective layer 46 is depicted as positioned between the first and second substrates 22, 26. In such an example, the combiner screen 18 may include one or more concealment structures to conceal an edge of the transflective layer 46. Further, the combiner screen 18 may include one or more antireflection coatings positioned on the first through fourth surfaces 22A-26B.

Figure 4A:
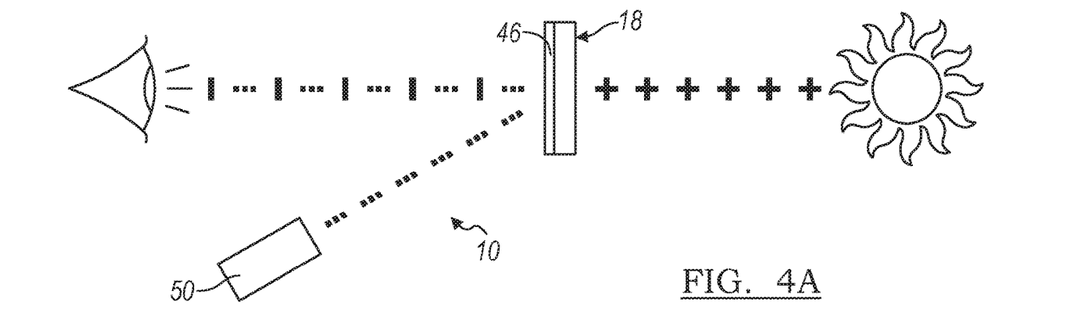
FIG. 4A depicts a schematic view of the heads up display system, according to one example.
Figure 4B:
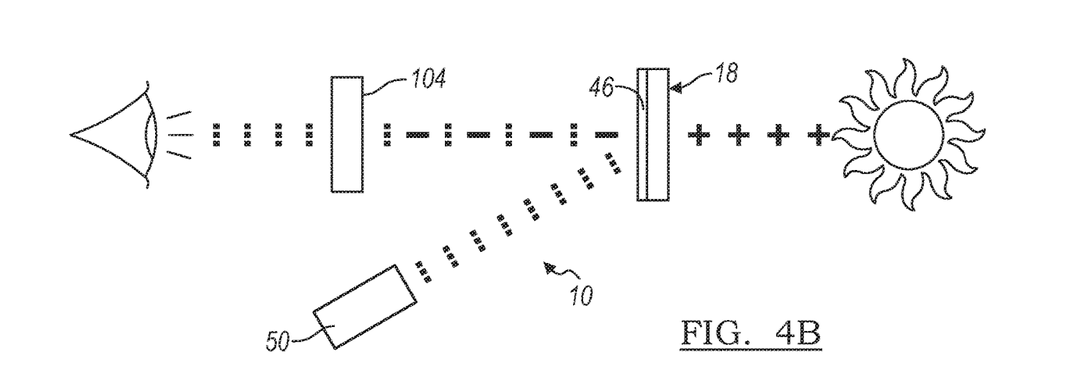
FIG. 4B depicts a schematic view of the heads up display system, according to another example.

Referring now to FIGS. 4A and 4B, depicted are examples of the heads up display 10 in operation and shown with (FIG. 4B) and without (FIG. 4A) a polarized viewing pane 104 (e.g., polarized sunglasses). To maximize the reflection of the primary image off of the transflective layer 46 of the combiner screen 18, it is desirable to align the polarization angle of the projector 50 to the reflective polarization angle of the transflective layer 46. Although any polarization angle may be used, there are some considerations for selecting the polarization angle. In one case (FIG. 4A), the transmission polarization angle of the transflective layer 46 can be near vertical and the reflective polarization angle will be aligned substantially at a horizontal angle while the projector 50 emits light having a horizontal angle polarization. Such a configuration may be advantageous, in that glare (e.g., horizontally polarized light reflected off surfaces) may be prevented from transmission through the combiner screen 18 while reflecting nearly all of the light from the projector 50. For example, greater than 50%, 60%, 70%, 80%, 90%, or greater than 99% of the polarized light from the projector 50, may be reflected toward the viewer. In another case (FIG. 4B), the polarization angle of the projector 50 can be near vertical and the reflective polarization angle of the transflective layer 46 of the combiner screen 18 may also be near vertical. In this case, the primary image reflected from the projector 50 would be easily seen even when wearing polarized sunglasses (e.g., the polarized viewing pane 104 or other polarized viewing filter) as the transmission polarization angle of the sunglasses is also vertical. In such an example, the combiner screen 18 may appear almost opaque since the horizontally polarized light transmitted through the transflective layer 46 would be blocked by the sunglasses; the viewer would still be able to view the primary image. It will be understood that in examples where the projector emits horizontally polarized light, use of the polarized viewing pane 104 may eliminate the reflected image available to the viewer, but the combiner screen 18 would still appear transparent. In yet another case, the light emitted from the projector 50 and the reflective polarization angle of the transflective layer 46 may be oriented at 45 degrees. Such an example may allow some of the light from the projector 50, and some of the light transmitted through the combiner screen 18, to be viewed by the viewer wearing sunglasses. Another configuration that may be advantageous is the use of circularly polarized light from the projector 50 and a reflective circular polarizer example of the transflective layer 46. In this configuration the projector 50 would emit light of the first circular polarization and the transflective layer 46 would reflect light of the first circular polarization and transmit light of a second circular polarization. Since sunglasses (e.g., the polarized viewing pane 104) are typically linearly polarized, some light of the first circular polarization and some light of the second circular polarization would be transmitted through the polarized sunglasses to the viewer. In this configuration the viewer could see both the projected image and the ambient background image regardless of head orientation while wearing polarized sunglasses.

Use of the present disclosure may offer several advantages. First, use of reflective polarizer examples of the transflective layer 46 allows an increase in the efficiency of the combiner screen 18. As the reflective polarizer both reflects light of one polarization and transmits light of another, it is able to increase the contrast of the combiner screen 18 simultaneously by reflecting a high percentage of light from the projector 50 while decreasing the transmittance of light through the combiner screen 18. Third, the above disclosure allows for the formation of light and cost effective combiner screens 18 for heads up displays. As an electro-optic element 78 is not always needed for the examples provided herein, the combiner screen 18 may be as simple to form as a transflective layer 46 on a curved substrate (e.g., the first or second substrates 22, 26). Fourth, the examples of heads up displays 10 provided herein may still be functional with the use of polarized sun glasses and polarized viewing panes 104. Fifth, the combiner screen 18 may function both to reduce the glare experienced by the viewer, while also functioning as a sun shade. Sixth, in examples utilizing a reflective polarizer as the transflective layer 46, there may be no significant reflection of light from the projector 50 off of surfaces behind (e.g., relative to the projector 50) the reflective polarizer since little to no display light will make it through. Such an example may be advantageous in that it will allow for the reduction or elimination of antireflective coatings on surfaces other than that between the projector 50 and the reflective polarizer. Seventh, use of electrochromic examples of the electro-optic element 78 may allow for a clear, or transparent state, failure mode of the electro-optic element 78 such that ambient light may still pass through the combiner screen 18 even when the electro-optic element 78 has failed (i.e., the combiner screen 18 may still be used). Further, use of electrochromic examples of the electro-optic element 78 may allow for angle independent gray scale of the combiner screen 18. As such, shifting of the viewing perspective of the combiner screen 18 may not affect the perceived level of ambient light attenuation, or image contrast, of the combiner screen 18.

Modifications of the disclosure will occur to those skilled in the art and to those who make or use the disclosure.

Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A heads up display system of a vehicle, comprising:
a combiner screen comprising:
a first substantially transparent substrate defining a first surface and a second surface;
a second substantially transparent substrate defining a third surface and a fourth surface;
a third substantially transparent substrate defining a fifth surface and a sixth surface, wherein the first substrate is positioned between the third substrate and the second substrate;
a primary seal disposed between the first and second substrates, wherein the seal and the first and second substrates define a cavity therebetween;
an electro-optic material positioned within the cavity; and
a transflective layer comprising a multilayer film positioned between the first and sixth surfaces; and
a projector for projecting light having a first polarization toward the fifth surface of the third substrate.

2. The heads up display system of claim 1, wherein the transflective layer comprises a reflective polarizer.

3. The heads up display system of claim 2, wherein the reflective polarizer comprises a dual brightness enhancement film.

4. The heads up display system of claim 2, wherein the reflective polarizer is configured to allow transmission of a second polarized light and to reflect the light having a first polarization.

5. The heads up display system of claim 2, wherein the transflective layer is laminated to the first surface of the first substrate.

6. The heads up display system of claim 5, wherein the first substrate has a spherical curvature.

7. The heads up display system of claim 6, wherein the third substrate is thinner than each of the first substrate and the second substrate.

8. The heads up display system of claim 1, wherein the combiner screen has a reflectance to the light from the projector of greater than about 50%.

9. A combiner screen for a heads up display, comprising:
a first substantially transparent substrate defining a first surface and a second surface;
a second substantially transparent substrate defining a third surface and a fourth surface, wherein at least one of the first and second substantially transparent substrates is curved along at least two axes;
a third substantially transparent substrate defining a fifth surface and a sixth surface, wherein the first substrate is positioned between the third substrate and the second substrate
an electro-optic material positioned between the first and second substantially transparent substrates; and
a reflective polarizer laminated to the first substantially transparent substrate between the sixth and first surfaces, wherein the reflective polarizer comprises a plastic film.

10. The combiner screen of claim 9, wherein the reflective polarizer comprises a multilayer film.

11. The combiner screen of claim 10, wherein the reflective polarizer absorbs horizontally polarized light.

12. The combiner screen of claim 9, wherein the third substrate is thinner than each of the first substrate and the second substrate.

13. The combiner screen of claim 9, wherein the reflective polarizer is configured to reflect vertically polarized light.

14. A heads up display system of a vehicle, comprising:
a projector for projecting light of a first polarization; and
a combiner screen comprising:
- a substantially transparent substrate defining a first surface and a second surface, wherein the substrate is curved along at least two axes; and
- a reflective polarizer comprising a plastic film laminated to the first surface of the substantially transparent substrate, wherein the combiner screen has a reflectance of the first polarization of light greater than about 40% and the combiner screen is operable at different transmittance levels and wherein a low end transmittance of the combiner screen is less than 10.5%.

15. The heads up display system of claim 14, further comprising:
- an electro-optic element positioned on an opposite side of the reflective polarizer than the substantially transparent substrate.

16. The heads up display system of claim 15, wherein the electro-optic element is an electrochromic element.

17. The heads up display system of claim 14, wherein the substrate has a radius of spherical curvature of less than or equal to about 1250 mm.

18. The heads up display system of claim 17, wherein the substrate has a radius of spherical curvature of less than or equal to about 750 mm.

19. The heads up display system of claim 18, wherein the reflective polarizer comprises a dual brightness enhancement film.

20. The heads up display system of claim 14, wherein the reflective polarizer comprises a multilayer plastic film.

* * * * *